United States Patent [19]

Agari

[11] Patent Number: 5,342,127

[45] Date of Patent: Aug. 30, 1994

[54] LINEAR MOTION ROLLING GUIDE UNIT

[75] Inventor: Norimasa Agari, Seki, Japan

[73] Assignee: Nippon Thompson Co., Ltd., Tokyo, Japan

[21] Appl. No.: 162,255

[22] Filed: Dec. 7, 1993

[30] Foreign Application Priority Data

Dec. 10, 1992 [JP] Japan .................... 4-090442[U]

[51] Int. Cl.5 ............................................ F16C 29/06
[52] U.S. Cl. ...................................... 384/15; 384/45
[58] Field of Search .................... 384/15, 43, 44, 45

[56] References Cited

U.S. PATENT DOCUMENTS

| | | | |
|---|---|---|---|
| 4,921,358 | 5/1990 | Kasuga et al. | 384/15 |
| 5,080,498 | 1/1992 | Tsukada | 384/15 |
| 5,149,205 | 9/1992 | Tsukada | 384/15 |

FOREIGN PATENT DOCUMENTS 3-98321 10/1991 Japan .
44725 2/1993 Japan .
121220 12/1993 Japan .

*Primary Examiner*—Thomas R. Hannon
*Attorney, Agent, or Firm*—Browdy and Neimark

[57] ABSTRACT

The linear motion rolling guide unit allows the under seal for sealing the circulating passage for the rolling elements to be mounted to the end caps by simply engaging it with the end caps. The linear motion rolling guide unit also has the function of adjusting the under seal as it wears out. The under seal has a lip portion engaging with the underside of the casing and the end caps and a lip portion engaging with the side wall surface of the track rail. Locking portions are formed at longitudinal ends of the core member of the under seal, and insertion grooves are formed in the end caps attached to the ends of the casing. Mounting the under seal to the end caps can be accomplished simply by inserting the locking portions into the insertion grooves.

5 Claims, 5 Drawing Sheets

LINEAR MOTION ROLLING GUIDE UNIT

BACKGROUND OF THE INVENTION

1. Field of the Invention

The present invention relates to a linear motion rolling guide unit, which is applied to a variety of relatively moving portions in machine tools and testing equipment and in which a slider is mounted slidable on a track rail with rolling elements interposed therebetween.

2. Description of the Prior Art

In conventional linear motion rolling guide units, the sealing between a track rail and a slider that slides on it is realized by end seals attached to the ends of the slider and under seals attached to the underside of the slider.

There is known a linear motion rolling guide unit with a construction as shown in FIG. 9. This linear motion rolling guide unit mainly comprises a track rail 1 having raceway grooves 9 formed longitudinally on both side walls 8 thereof, and a slider 18 slidably mounted astride the track rail 1. The slider 18 includes a casing 2, which is slidable relative to the track rail 1 and has raceway grooves 7 formed at positions facing the raceway grooves 9 on the track rail 1, a number of balls 4 or rolling elements trapped between the opposing raceway grooves 7 and 9 to allow relative motion between the rail and the casing, and end caps 5 attached to the longitudinal ends of the casing, the longitudinal direction being the sliding direction of the casing 2.

The end cap 5 has an end seal 6 that provides the sealing between the track rail 1 and the slider 18. The casing 2 is provided with under seals 3 for sealing between the casing 2, the longitudinal side wall surfaces 8 of the track rail 1, and the underside of the casing 2.

The slider 18 is mounted astride on the track rail 1 and freely slidable relative to it through a number of balls 4 circulating along the raceway grooves 9 in the track rail 1. The large number of balls 4 are led into a raceway 28 formed between the raceway groove 9 of the track rail 1 and the raceway groove 7 of the casing 2, into a direction changing passage formed in the end cap 6 and from there into a return passage 29 formed parallel to the raceway groove 7 in the casing 2, so that the rolling elements circulate in an endless raceway.

The under seal 3, though it has an advantage of being simple in construction and easily manufactured, also has drawbacks that because the under seal 3 is thin, it is easily deformed by external forces and by positional errors between it and the casing 2 and track rail 1, the casing and track rail having the raceway grooves 7, 9 respectively. Hence, the under seal 3, which is subjected to temperature variations and exposed to lubricants as the slider 18 slides on the track rail 1, might swell and be deformed deteriorating the sealing performance.

Furthermore, when the under seal 3 in the conventional linear motion rolling guide unit is formed of plastics and put in operation for a long period of time, it may be swelled by soaking lubricants. In that case, because the under seal 3 is fixed at its ends to the metallic casing 2 as by screws, it cannot move relative to the casing 2 and is thus deformed. When the under seal 3 is deformed, the contact condition or sealing condition between the under side of the casing 2 and the upper surface of the under seal 3 deteriorates, even deforming the sealing portion. In the conventional linear motion rolling guide unit, when the contact condition between the sealing portion and the side wall surfaces 8 of the track rail 1 deteriorates, the sealing performance, particularly, the capability of preventing foreign substances such as dust from entering the raceways is degraded.

As an example device that tackles the above problem, a linear motion guide bearing disclosed in the Japanese Utility Model No. 121220/1991 may be cited. An under seal device of the linear motion guide bearing has two-pronged projections protruding toward the underside of the slider, the two prongs being undulated in the direction of axis of the under seal and elastically deformable toward each other. The slider has the axial end portions of the underside thereof formed with vertical holes, into which the two-pronged projections of the under seal are fitted, and also with through-holes that intersect the vertical holes perpendicularly and pass through the arm or wing portions of the slider. The two-pronged projection of the under seal is engaged in the through-holes.

Another linear motion rolling guide unit to solve the above problem is disclosed in the Japanese Patent Laid-Open No. 44725/1993. This linear motion rolling guide unit has an engagement portion formed at least at one longitudinal end of the under seal and an engagement hole formed in the underside of the end cap for slidably receiving the engagement portion.

The applicant of this invention previously developed a linear motion rolling guide unit and filed an application for a patent (Japanese Utility Model No. 63565/1992). The previously developed linear motion rolling guide unit is constructed as follows. An under seal comprises a core member made of metal and an elastic sealing member having lip portions secured to the core member. A pair of projections having locking portions are provided to the underside of the end caps in such a way that they extend longitudinally and are spaced apart widthwise from each other. The core member is formed with longitudinally elongate engagement holes whose opposing longitudinal edges are formed as locking detents. The locking portions are elastically deformed to engage the locking detents thereby mounting the under seal to the end caps.

In the above conventional linear motion rolling guide unit, the under seal, though it is simple in construction and easy to manufacture, has problems that the under seal will easily develop positional errors with respect to the casing and track rail having the raceway grooves, that the mounting is not simple, and that it is easily deformed by swelling, thermal stresses or external forces. Over a long period of use, the lip portion that slides in contact with the side wall surfaces of the track rail will be worn out, making the adjustment of the under seal impossible. This requires replacing the under seal to restore a good sealing condition. In this way, the under seal of the conventional linear motion rolling guide unit needs improvements in terms of sealing performance and durability.

Further, with the conventional linear motion rolling guide unit, to improve the sealing performance requires accurate positioning of the locking piece and engagement holes in the mounting portion between the under seal and the end cap. It is also complex and difficult to mount and dismount the under seal to and from the end cap. Another disadvantage of the conventional linear motion rolling guide unit is that when the lip portion of the under seal that is in contact with the side wall surfaces of the track rail is worn out, the engagement condition of the lip portion cannot be adjusted, requiring the under seal to be replaced.

SUMMARY OF THE INVENTION

A major objective of the present invention is to overcome the above-mentioned drawbacks and to provide
- a linear motion rolling guide unit, which comprises:
- a track rail having raceway grooves formed on longitudinally extending side wall surfaces thereof;
- a casing slidable relative to the track rail and having raceway grooves formed at positions facing the raceway grooves on the track rail;
- end caps mounted to the longitudinal ends of the casing;
- a number of rolling elements circulating through raceways formed between the opposing raceway grooves;
- under seals mounted to the end caps, the under seals each including a core member and a seal member secured to the core member and having lip portions;
- insertion grooves formed on an inner lateral side of the end caps facing the track rail and on a far longitudinal side with respect to the casing, the insertion grooves extending in the lateral direction; and
- locking portions provided to the longitudinal ends of the core member and extending upwardly, the locking portions being adapted to fit laterally into the insertion grooves in the end caps to mount the under seal to the end caps.

The locking portions provided to the core member of the under seal comprise riser portions formed at both ends of and on the upper surface of the core member and extending widthwise and bent portions bent inwardly of the core member from the top ends of the riser portions; and the insertion grooves formed in the end caps comprise notched grooves cut widthwise against which the riser portions rest and engagement grooves cut widthwise into which the bent portions are inserted.

Alternatively, the locking portions provided to the core member of the under seal comprise riser portions formed at both ends of and on the upper surface of the core member and extending longitudinally and bent portions bent laterally outwardly of the end caps from the top ends of the riser portions; and the insertion grooves formed in the end caps comprise notched grooves cut longitudinally against which the riser portions rest and engagement grooves cut longitudinally into which the bent portions are inserted.

The under seal is mounted to the undersides of the casing and the end caps by a simple step of inserting the locking portions of the under seal to the insertion grooves in the end caps. With the under seal mounted in place, the lip portions of the under seal are brought into contact with the undersides of the casing and the end caps to perform a sealing function. When the slider provided with the under seals is mounted on the track rail, the other lip portion of the under seal is placed in contact with the side wall surface of the track rail, thus reliably sealing the circulating passages for the rolling elements.

The under seal is movable in the lateral direction with respect to the end caps, allowing for machining errors in the lateral direction. The under seal is also capable of adjusting the pressure at which the seal member of the under seal bears on the track rail. Therefore, even when the lip portion of the under seal is worn out by the sliding contact with the side wall surface of the track rail, the recovering force of the lip portion retains the sealing performance. If the lip portion is further worn, the sealing performance can be maintained by moving the under seal toward the track rail.

This linear motion rolling guide unit is characterized by a simple construction of the mounting portion between the under seals and the end caps that permits easy mounting of the under seal by simply engaging the under seal to the end caps. Further, this guide unit does not require bolts and other fastening parts that are used by the conventional linear motion rolling guide unit in assembling the under seal to the slider. Hence, this linear motion rolling guide unit can be applied to the existing guide units if the end caps in the latter units can be formed with the insertion grooves. The mounting of the under seal to the end caps requires only a simple operation of inserting the under seal into the insertion grooves in the end caps from the inner side, i.e. from the track rail side. This makes the positioning of the under seal with respect to the end caps very simple, and the mounting procedure is also very simple and reliable. Furthermore, the mounting and dismounting of the under seal to and from the end caps is done after simply dismounting the slider from the track rail.

If there are gaps due to machining errors between the locking portions of the under seal and the insertion grooves in the end caps, the firm and reliable contact of the lip portions of the under seal with the casing and the end caps and with the side wall surfaces of the track rail assures good sealing. With the slider mounted astride the track rail, there is no possibility of the under seal coming off the end caps by erroneous operations.

Prestressing the elastic force of the core member in the longitudinal direction, with the under seal mounted to the end caps, ensures that the under seal, the casing and the end caps, when deformed longitudinally by thermal stresses or by swelling due to lubricants, are allowed to move freely longitudinally relative to each other while keeping the lip portion pressed against the track rail, thus maintaining the sealing performance of the under seal.

The lip portion of the under seal will wear over a long period of use because it slides in contact with the side wall surface of the track rail. But prestressing the elastic force of the core member widthwise, with the under seal mounted to the end caps, causes the lip portion to be fed toward the track rail by the spring force of the core member as the lip portion wears out, thus compensating for the wear of the lip portion. The wear adjustment on the seal member can be made easily by moving the under seal engaged in the insertion grooves in the end caps a distance equal to the amount of wear toward or away from the track rail. With this under seal, therefore, there is no need to replace the under seal each time the lip portion of the seal member of the under seal wears out, and the time it takes to make adjustment is shorter than the time required for replacing the under seal.

DETAILED DESCRIPTION OF THE EMBODIMENT

Figure 1:
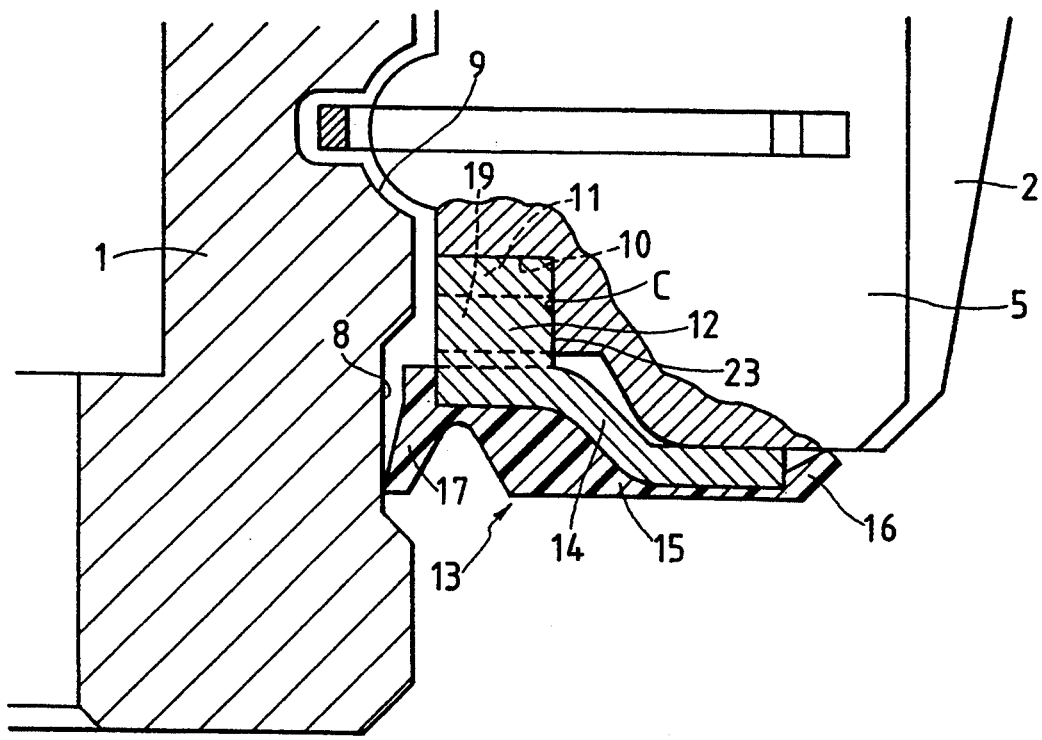
FIG. 1 is a partially cut-away cross section of a linear motion rolling guide unit embodying the present invention, taken along the line A—A of FIG. 2.
Figure 2:
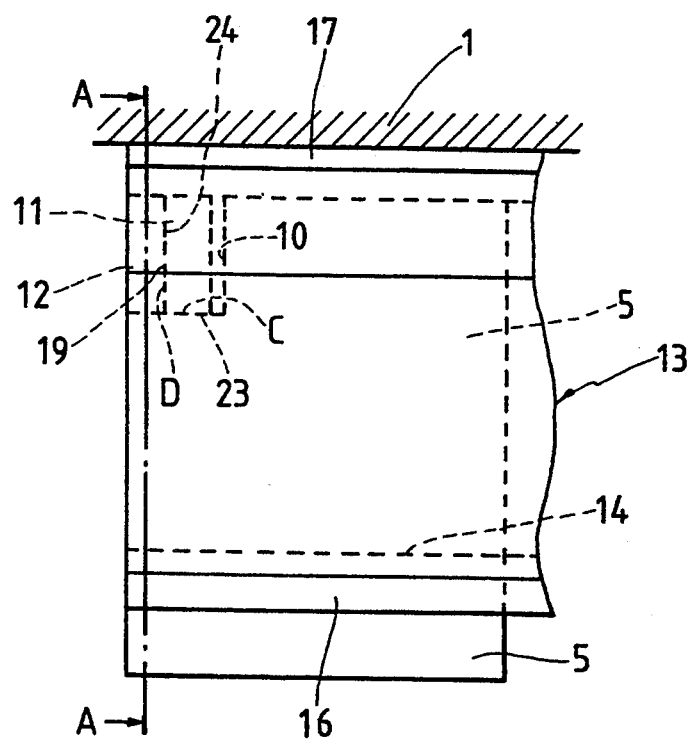
FIG. 2 is a bottom view of the under seal in the linear motion rolling guide unit of FIG. 1.
Figure 3:
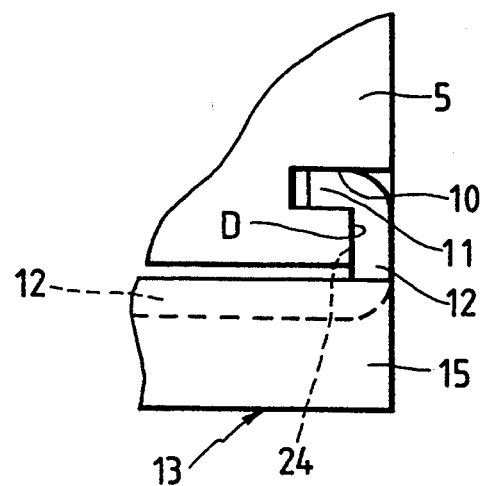
FIG. 3 is an internal view showing the mounting structure of the end cap and the under seal.
Figure 4:
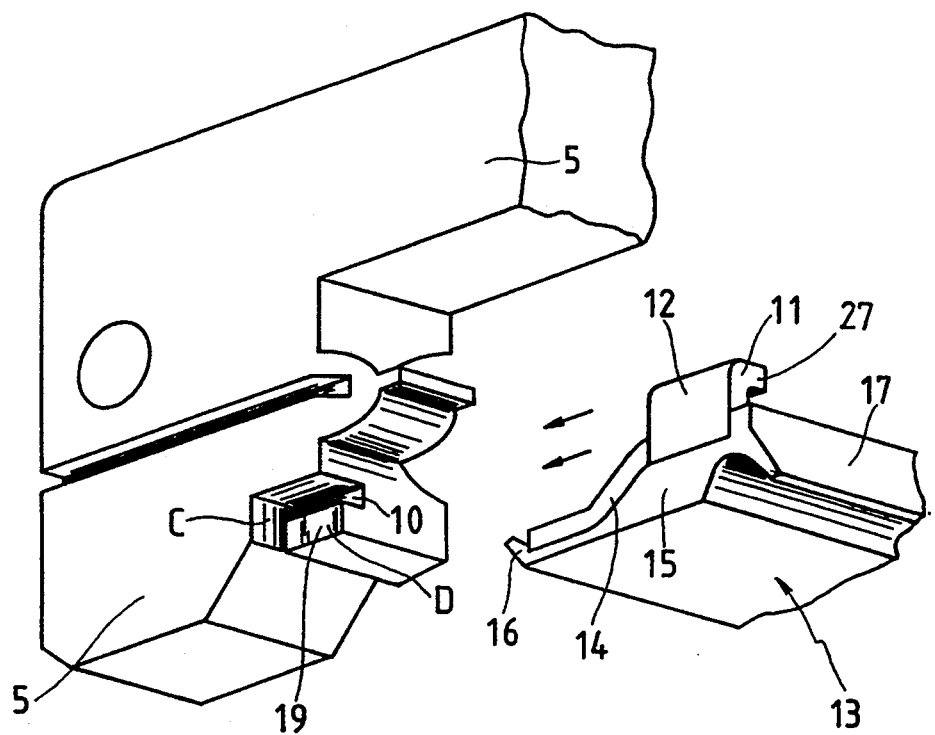
FIG. 4 is an exploded perspective view of a part of the end cap and the under seal in the linear motion rolling guide unit of FIG. 1 showing their relationship of engagement.

Now, one embodiment of the linear motion rolling guide unit according to this invention will be described by referring to FIGS. 1, 2, 3 and 4. In these figures components having the same functions or actions as those in FIG. 9 are assigned like reference numerals.

Figure 9:
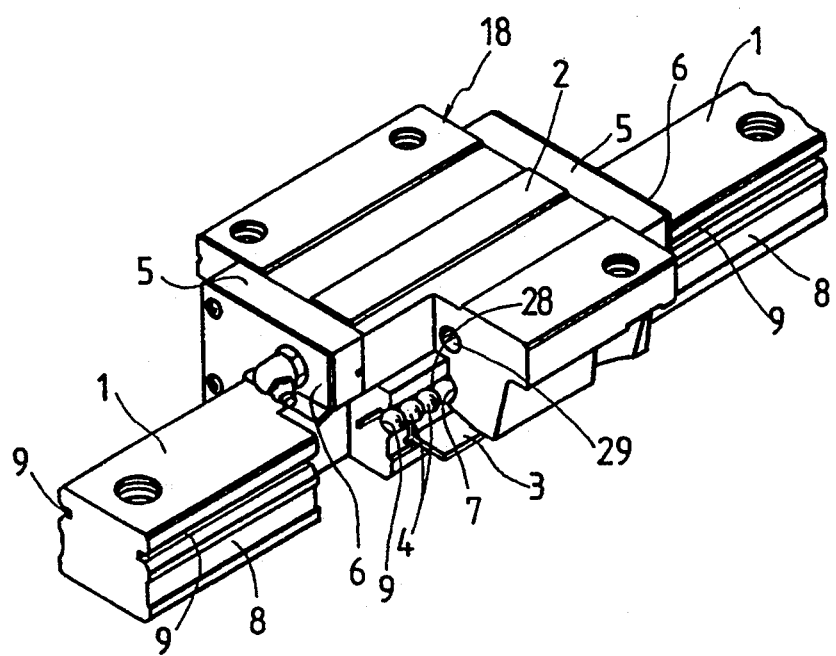
FIG. 9 is a perspective view of a conventional linear motion rolling guide unit.

The linear motion rolling guide unit of this invention is basically the same in construction as the linear motion rolling guide unit of FIG. 9 and is characterized in the mounting structure of the under seal mounted to the end cap.

Like the construction shown in FIG. 9, the linear motion rolling guide unit of this invention comprises: a track rail 1 having raceway grooves 9 extending longitudinally on both side wall surfaces 8 thereof; and a slider 18 slidably mounted on the track rail 1. The slider 18 is slidable relative to the track rail 1 and has a casing 2, which is formed with raceway grooves 7 at positions facing the raceway grooves 9; a number of rolling elements 4 circulating through a raceway defined by the opposing raceway grooves 7 and 9 to allow relative motion of the slider 18 and the track rail 1; end caps 5 attached to the longitudinal ends of the casing 2; end seals 6 attached to the end surfaces of the end caps 5; and under seals 13 attached to the end caps 5.

The slider 18 provided with the end caps 5 at the ends thereof is shaped like an inverted letter U, straddling the track rail 1. The end caps 5 are each formed with a direction changing passage for the balls 4. The direction changing passage changes the direction of travel of the balls 4 which move along the circulating path defined between the track rail 1 and the casing 2 as the slider 18 slides on the track rail 1.

In this linear motion rolling guide unit, the end cap 5 is formed with an insertion groove 10 extending widthwise on the inner side of the end cap 5 facing the track rail 1 and on the far side with respect to the casing 2. The under seal 13 consists of a core member 14 made of such elastic metal as steel and a seal member 15 made of such elastic material as rubber and plastics which is secured to the core member 14 and has lip portions 16, 17. The seal member 15 has a lip portion 16 pressed sealingly against the undersides of the casing 2 and the end caps 5 and another lip portion 17 bearing sealingly on the side wall surface 8 of the track rail 1. The core member 14 has at its longitudinal ends riser portions 12 which rise upward and extend widthwise and whose upper ends are bent toward each other, i.e. toward the center of the core member to form locking portions 11.

Mounting the under seal 13 to the end caps 5 is accomplished by engaging the under seal 13 with the end caps 5, i.e. fitting the locking portions 11 of the core member 14 into the insertion grooves 10 in the end caps 5 widthwise. The end cap 5 is formed with the insertion groove 10 cut widthwise for receiving the locking portion 11 of the under seal and with a notched groove 19 cut widthwise below the insertion groove 10 for receiving the riser portion 12 of the locking portion 11.

In this linear motion rolling guide unit, the under seal 13 is positioned laterally with respect to the end caps 5 by mounting the under seal 13 so that lateral end surfaces 23 of the locking portions 11 on the far side from the track rail 1 come into contact with lateral engagement surfaces C of the insertion grooves 10 in the end caps 5. The positioning of the under seal 13 in the longitudinal direction with respect to the end caps 5 is achieved by mounting the under seal 13 in such a way that inner surfaces 24 of the locking portions 11 facing each other contact longitudinal engagement surfaces D of the notched portions 19 of the insertion grooves 10 in the end caps 5.

The core member 14 of the under seal 13 has a flat portion formed at the lateral central area thereof and closer to the underside of the end cap 5 than the lip portions 16, 17 are. At the longitudinal ends of the flat portion of the core member 14, the riser portions 12 extend toward the end cap 5 and are bent to form the locking portions 11 that fit into the insertion grooves 10. The locking portions 11 are bent in directions such that the front ends of the riser portions 12 face each other.

If the under seal 13 is mounted to the end caps 5 so that the elastic force of the core member 14 is prestressed in the longitudinal direction, it is possible to absorb displacements of the under seal 13, casing 2 and end caps 5 caused by their longitudinal deformations that may occur when subjected to thermal stresses and exposed to lubricants, while the lip portions 16, 17 are kept pressed against the track rail 1, keeping the sealing performance of the under seal 13 from deteriorating.

Next, another embodiment of the linear motion rolling guide unit according to this invention will be described by referring to FIGS. 5, 6, 7 and 8. In these figures, components having the same functions or actions as those in FIG. 9 are assigned like reference numerals.

While in the first embodiment the locking portions 11 formed on the core member 14 of the under seal 13 are shown to be bent from the riser portions 12 to face each other, the second embodiment has the locking portions 21 bent in a direction away from the track rail 1, i.e. in an outwardly lateral direction. The insertion grooves 27 are so formed in the end caps 5 that the notched portions 20 that receive the riser portions 22 of the locking portions 21 face inwardly to the track rail 1. At its longitudinal ends, the core member 14 is formed with the riser portions 22 that extend upwardly and longitudinally and which have their front ends bent laterally outwardly to form the locking portions 21. The end cap 5 is formed with the insertion groove 27 cut longitudinally for receiving the locking portion 21 of the under seal 13 and with the notched groove 20 cut longitudinally below the insertion groove 27 for receiving the riser portion 22 of the locking portion 21.

The under seal 13 is positioned laterally with respect to the end caps 5 by mounting the under seal 13 to the end caps 5 so that lateral side surfaces 25 of the locking portions 21 facing in a direction opposite the track rail engage with lateral engagement surfaces E of the notched grooves 20 in the end caps 5. The longitudinal positioning of the under seal with respect to the end caps 5 is accomplished by mounting the under seal 13 in such a way that longitudinally inner surfaces 26 of the locking portions 21 bear on the longitudinal engagement surfaces F of the insertion grooves 27 and notched portions 20 in the end caps 5.

The construction of the body of the under seal of the second embodiment is similar to that of the first embodiment shown in FIG. 1, except that the engagement portions 21 are bent in a direction opposite the track rail 1. While in the second embodiment, the locking portions 21 are bent almost at right angles with respect to the riser portions 22, it is possible to bend them more than 90 degrees to give them a spring effect so as to cause the lip portion 16 to bear strongly against the undersides of the end caps 5.

Figure 5:
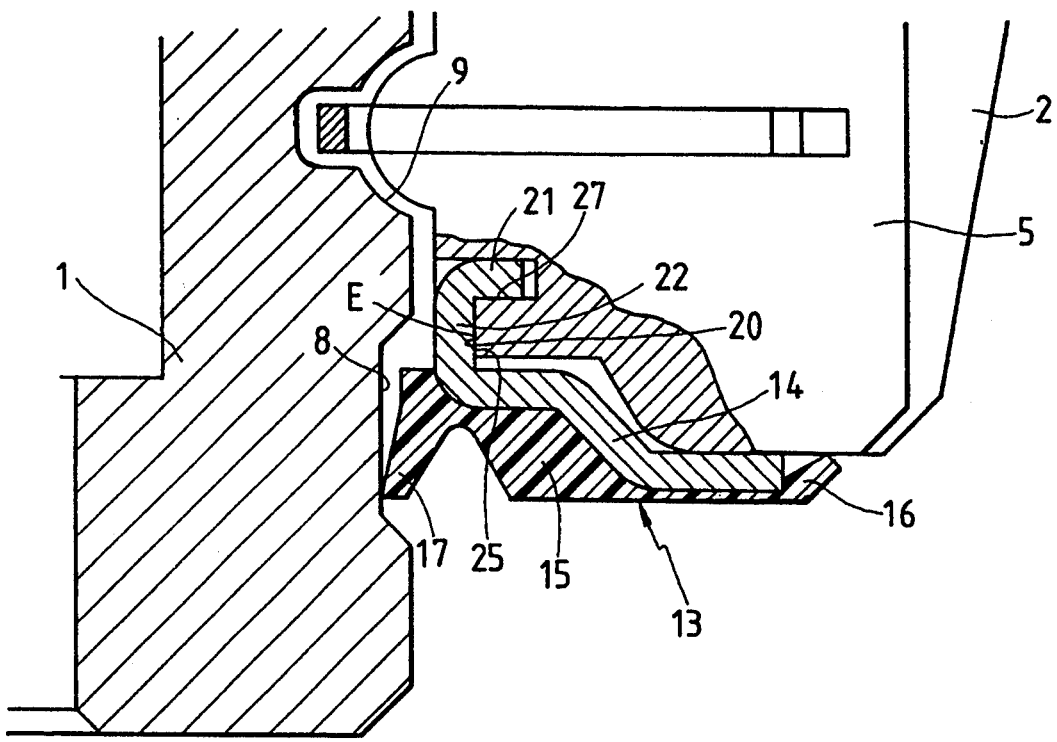
FIG. 5 is a partially cut-away cross section of another embodiment of the linear motion rolling guide unit according to the present invention, taken along the line B—B of FIG. 6.
Figure 6:
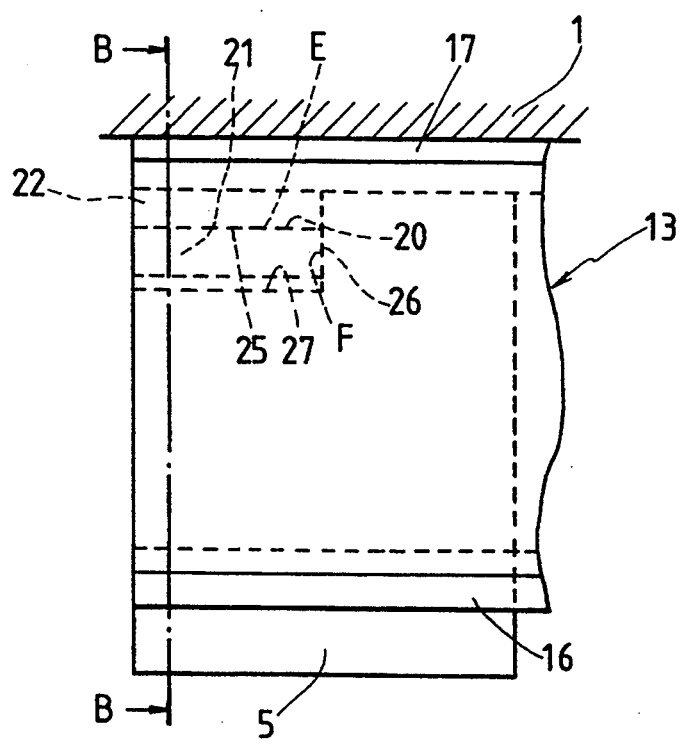
FIG. 6 is a bottom view of the under seal in the linear motion rolling guide unit of FIG. 5.
Figure 7:
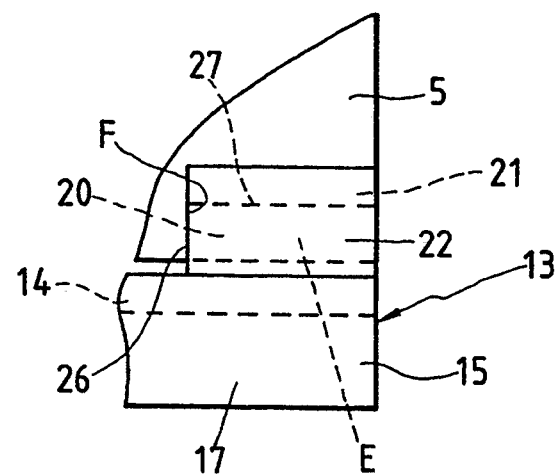
FIG. 7 is an internal view showing the mounting structure of the end cap and the under seal.
Figure 8:
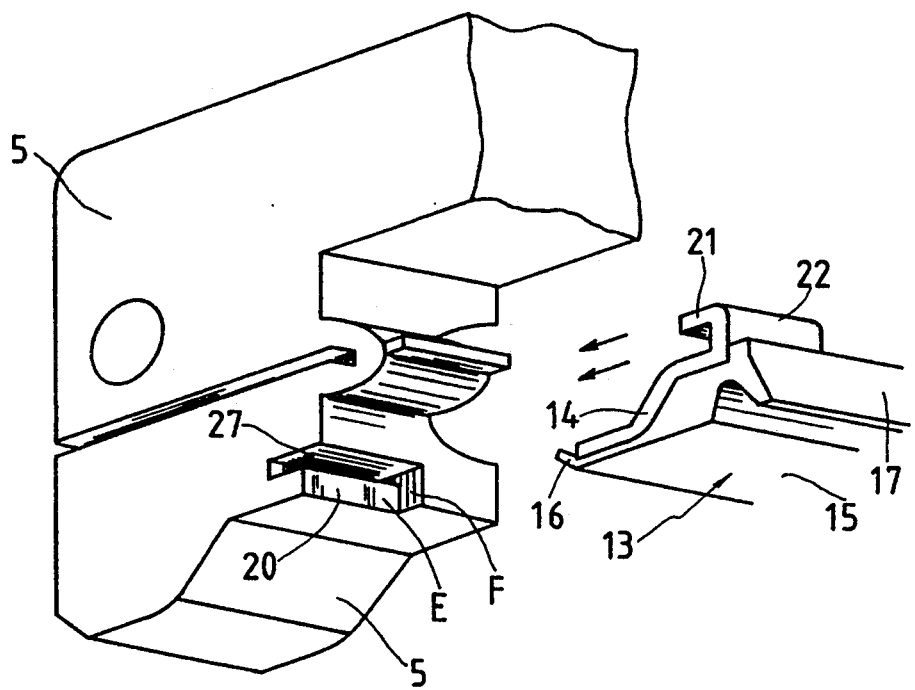
FIG. 8 is an exploded perspective view of a part of the end cap and the under seal in the linear motion rolling guide unit of FIG. 5 showing their relationship of engagement.

In the preceding embodiments, the flat portion at the laterally central area of the body of the under seal 13 is shown to be closer to the end cap than the lip portions 16, 17. The under seal may take other constructions. For example, the core member 14 of the under seal 13 may be formed as a flat plate. When the core member 14 is formed flat, it is preferred that the lip portion 11 in contact with the side wall surface 8 of the track rail 1 bear on it in a bent condition. Although the insertion groove 27 of FIG. 5 is shown to be open also on the outer side, the outer opening need not be provided if the locking portions 21 of the under seal 13 are located on the longitudinally inner side of the under seal 13. In that case, the insertion grooves 27 are preferably formed large enough to allow displacement of the under seal 13 when it is longitudinally deformed by swelling or thermal stresses.

The lip portion 17 of the under seal 13, because it slides in contact with the side wall surface 8 of the track rail, will be worn over a long period of use. If, with the under seal 13 mounted to the end caps 5, the elastic force of the core member 14 of the under seal 13 is prestressed in the lateral direction to press the lip portion 17 against the track rail 1, the lip portion, as it wears out, will be advanced toward the track rail 1 by the spring force of the core member 14, thus compensating for the wear. If situation demands, the wear adjustment on the seal member 15 can be made easily by moving the under seal 13 engaged in the insertion grooves 27 in the end caps 5 a distance equal to the amount of wear toward or away from the track rail 1. With this under seal, therefore, there is no need to replace the under seal 13 each time the lip portion 17 of the seal member 15 of the under seal 13 wears out, and the time it takes to make adjustment is shorter than the time required for replacing the under seal 13.

What is claimed is:

1. A linear motion rolling guide unit comprising:
   a track rail having first raceway grooves formed on longitudinally extending side wall surfaces thereof;
   a casing slidable relative to the track rail and having second raceway grooves formed at positions facing the first raceway grooves;
   end caps mounted to the longitudinal ends of the casing;
   rolling elements circulating through raceways formed between the first raceway grooves and the second raceway grooves;
   under seals having seal portions for sealing the casing, the end caps and the track rail, the under seals each including a core member and a seal member secured to the core member and having lip portions;
   insertion grooves formed on an inner lateral side of the end caps facing the track rail and on a far longitudinal side with respect to the casing, the insertion grooves extending in the lateral direction; and
   locking portions provided to the longitudinal ends of the core member and extending upwardly, the locking portions being adapted to fit laterally into the insertion grooves in the end caps to mount the under seal to the end caps.

2. A linear motion rolling guide unit according to claim 1, wherein the locking portions provided to the core member of the under seal comprise riser portions formed at both ends of and on the upper surface of the core member and extending widthwise and bent portions bent inwardly of the core member from the top ends of the riser portions, and wherein the insertion grooves formed in the end caps comprise notched grooves cut widthwise against which the riser portions rest and engagement grooves cut widthwise into which the bent portions are inserted.

3. A linear motion rolling guide unit according to claim 2, wherein the locking portions provided to the core member has an elastic force and the core member is prestressed longitudinally with respect to the end caps.

4. A linear motion rolling guide unit according to claim 1, wherein the locking portions provided to the core member of the under seal comprise riser portions formed at both ends of and on the upper surface of the core member and extending longitudinally and bent portions bent laterally outwardly of the end caps from the top ends of the riser portions, and wherein the insertion grooves formed in the end caps comprise notched grooves cut longitudinally against which the riser portions rest and engagement grooves cut longitudinally into which the bent portions are inserted.

5. A linear motion rolling guide unit according to claim 4, wherein the locking portions provided to the core member has an elastic force and the core member is prestressed widthwise with respect to the end caps.

* * * * *